United States Patent [19]
Greenblatt et al.

[11] Patent Number: 6,044,699
[45] Date of Patent: Apr. 4, 2000

[54] GAUGE FOR ACCURATELY MEASURING PRECIPITATION

[75] Inventors: Clifford Lee Greenblatt, Owings Mills; Mellissa Jamie Stuart Dalby, Woodlawn; Steven Mang, Forest Hill, all of Md.

[73] Assignee: Belfort Instrument Company, Baltimore, Md.

[21] Appl. No.: 08/992,248

[22] Filed: Dec. 17, 1997

[51] Int. Cl.$^7$ .................................................. G01W 1/00
[52] U.S. Cl. ...................... 73/170.17; 73/170.21
[58] Field of Search .................... 73/170.17, 170.18, 73/170.19, 170.21, 700, 704

[56] References Cited

U.S. PATENT DOCUMENTS

| 756,109 | 3/1904 | Friez et al. . | |
|---|---|---|---|
| 2,509,522 | 5/1950 | Phillips . | |
| 2,711,099 | 6/1955 | Hastings . | |
| 3,243,999 | 4/1966 | Barker | 73/170.23 |
| 4,233,841 | 11/1980 | Abele . | |
| 4,476,718 | 10/1984 | Plank et al. | 73/170.23 |
| 4,583,399 | 4/1986 | Walsh et al. . | |
| 4,895,022 | 1/1990 | Noren . | |
| 4,914,962 | 4/1990 | Clements . | |
| 5,038,606 | 8/1991 | Geschwender et al. . | |
| 5,245,874 | 9/1993 | Baer . | |
| 5,571,963 | 11/1996 | Balchin . | |
| 5,744,711 | 4/1998 | Rasmussen et al. | 73/170.21 |

FOREIGN PATENT DOCUMENTS

| 3935333 | 4/1991 | Germany | 73/170.17 |
|---|---|---|---|

*Primary Examiner*—Max Noori
*Assistant Examiner*—Abdullahi Aw-Musse
*Attorney, Agent, or Firm*—Paul Adams; Rod D. Baker

[57] ABSTRACT

A precipitation gauge that collects liquid and frozen precipitation in a reservoir, suspended by force-sensing transducers, permitting the accurate and precise measurement of accumulated precipitation. A proportionally-heated collector assembly prevents the accumulation of frozen rain or snow on the collector inner surface, converting it into water that enters the reservoir, with minimum electrical energy consumption. The force-sensing transducer may be a programmably excited vibrating strip transducer.

20 Claims, 5 Drawing Sheets

GAUGE FOR ACCURATELY MEASURING PRECIPITATION

BACKGROUND OF THE INVENTION

1. Field of the Invention (Technical Field)

This invention relates to a precipitation gauge of a type that collects liquid and frozen precipitation and accurately measures the accumulation thereof.

2. Background of the Invention

It is well known to measure rainfall for a variety of purposes including immediate and historical data for use in agriculture and other human activities including the satisfaction of curiosity. When high accuracy is required, a number of problems arise in providing a device and method for measuring precipitation. Among these problems are the necessity of precisely converting the weight or volume of collected precipitation to a measurement typically given in inches of precipitation. In many instances it is desirable to measure the precipitation in remote areas where manual attendance is difficult and it therefore is desirable to provide a means and a method for transmitting the measurements from the remote site. Operation of a remote measurement device also may entail transmitting messages from a central site to the remote site for a variety of purposes. In such remote applications it is extremely important that mechanical malfunctions of the measuring device or gauge be minimized. It may also be desirable to measure both total accumulated precipitation during a fixed period as well as incremental accumulation, thereby providing a rate of precipitation during a selected period. Where the remote device is placed in an environment where there is wide temperature differences, it will be necessary to compensate the measurement of precipitation to accommodate the variations in temperature. It is also necessary to be able to calibrate the gauge from time to time. And since such gauges may be portable, or relatively portable, it may be practically necessary to provide overload and shock protection for what is inherently a delicate instrument.

While all of these difficulties are encountered in rain measuring devices, a major problem is the need to measure both rain and snowfall. Snow measurement problems include assuring that the snowflakes are converted to a liquid equivalent which is the typical way in which precipitation is expressed. Other problems include the possibility of snow accumulation in the opening of the reservoir or container in which the precipitation is accumulated over a prolonged period of time. Additional problems are encountered where the snowfall is accompanied by wind whereby the wind forces the snow against a portion of the opening of the container resulting in a decrease in the opening which adversely affects the calculation of the precipitation since the calculation is dependent upon a measurement that is based on a fixed area in which the precipitation is collected. Similar problems may exist with freezing rain.

3. Background Art

Many of the above-described problems have been addressed in one manner or another in the prior art, though many other problems remain to be solved. The most simple type of precipitation gauge measures rain by permitting the accumulation of the liquid in a container which in turn operates a float or a device that indicates hydrostatic pressure. Such device is shown in U.S. Pat. No. 2,509,522 which shows a simple visual indicator of accumulated rainfall based on indicia marked on a transparent receptacle. A float-type gauge with indicia to indicate the level of the float is shown in U.S. Pat. No. 5,245,874 where the float utilizes optical means to determine the height of the float and converts optical signals into electrical signals which may be transmitted. Another float-type device with a visible cylindrical container is shown in U.S. Pat. No. 5,038,606. Still another rainwater gauge is shown in U.S. Pat. No. 4,233,841 which includes an elongated hollow, open-ended cylinder including a funnel which directs the rainfall into a graduated measuring tube and in which the inner surface of the opening, including a funnel, of the cylinder is coated with a hydrophobic material so as to assure that all of the rain is deposited into the graduated tube. Still another device discloses a particular type of collector system wherein one container is filled to its capacity, and then overflows into a second container whereby the accumulation is a measurement of the volume of the first container plus the portion of the volume of the second container that contains the precipitation. Other devices, such as that shown in U.S. Pat. No. 4,895,022 are primarily concerned with mitigating the effects of winds on precipitation measurement by attempting to minimize the disturbance of the wind and wind-borne rain due to the very presence of the gauge. One device that is particularly designed to cope with the problems involved in the measuring of snowfall as well as rainfall is shown in U.S. Pat. No. 5,571,963 in which the container is partially filled with antifreeze which, of course, reduces the snowflakes to their liquid equivalent without the requirement for any heating means; the patented device also utilizes a spring weighing mechanism.

SUMMARY OF THE INVENTION
(DISCLOSURE OF THE INVENTION)

The problem of the adverse effect of wind on precipitation gauges that are based on measurements of the weight of the precipitation collected arise because the air pressure varies on the surface of the liquid collected thus affecting the measurement of the force (weight plus air pressure) on the force-measuring device. It is an object of the present invention to provide for pressure equilibrium around the collection reservoir so as to eliminate or at least mitigate the effects of wind induced forces on the measurement.

Wind effects on precipitation gauges can be exacerbated by the structure of the gauge, which causes turbulent wind flow near the gauge orifice. Gauges with tapered or conical upper sections can give rise to greater up-welling when placed in a horizontal wind flow. Up-welling results in reduced catch in all forms of precipitation, but is most noticeable with dry snow. It is an object of this invention to utilize a more or less straight cylinder, causing the wind flow to break around the side of the gauge. A small and steeply sloped tapered section, necessary to transition from outer housing to collector, is optimized to reduce turbulence around the collection orifice. The straight cylinder design furthermore reduces the build-up of ice and snow around the orifice, which might otherwise affect the collection area.

The problem with frozen precipitation on the inside of the collector assembly as described above is overcome in the present device by minimizing the length of the collector cylinder so as to reduce the area for snow and ice accumulation before being detected. It is a further object of this invention to provide a collector assembly that is supported by the structure that suspends the container in which the precipitation is weighed so that any accumulated ice or snow on the outside of the collector assembly is not introduced into the weighing. It is still another object of this invention to provide a collector assembly that has heated regions which are proportionally controlled so as to maintain the collector assembly as a whole slightly above melting point to assure that any accumulated snow or ice on the inner collector surface is melted and flows into the weighing container or reservoir. Still another object of this invention provides a means for weighing the container in which the precipitation has been accumulated through force transducers which measure the sum of tensions in links that suspend the container from a supporting structure thereby eliminating any springs with the inherent problem of varying spring constant with displacement or with temperature changes. It is still a further object to eliminate any suspension mechanisms below the reservoir that collects the precipitation because these mechanical systems typically involve moving parts which introduce friction, hysteresis, and non-linear behavior which greatly complicates accurate measurement.

The present invention overcomes many of the problems in the prior art by providing a method and device, such as a gauge, for measuring the liquid equivalent of all forms of natural precipitation, including rain and snow or even sleet and ice, and includes a support structure, a precipitation reservoir, weighing means for supporting the reservoir from the structure, and electronic control means cooperating with the weighing means for converting measurement of the weight of the reservoir to accumulated precipitation. The weighing means may comprise one or more transducers, such as a vibrating strip force sensing transducer. Vibrating strip sensors have particular advantages which enable the gauge to be optimized for high accuracy over a wide dynamic range of measurement, while retaining known benefits of low temperature effect and drift. The electronic control means may provide for programmable excitation energy to the vibrating strip force sensing transducer to provide vibration with sufficient amplitude to assure accurate transducer signal output under a wide range of loads. A particular feature of the invention includes the provision of a collector assembly mounted on the support structure that includes heating means such as a plurality of independently heated regions that are proportionally controlled to maintain each of the regions at a particular above-freezing temperature notwithstanding the exposure of a portion of a collector assembly to wind, accumulated snow, or ice.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE PREFERRED EMBODIMENT (BEST MODES FOR CARRYING OUT THE INVENTION)

Figure 1:
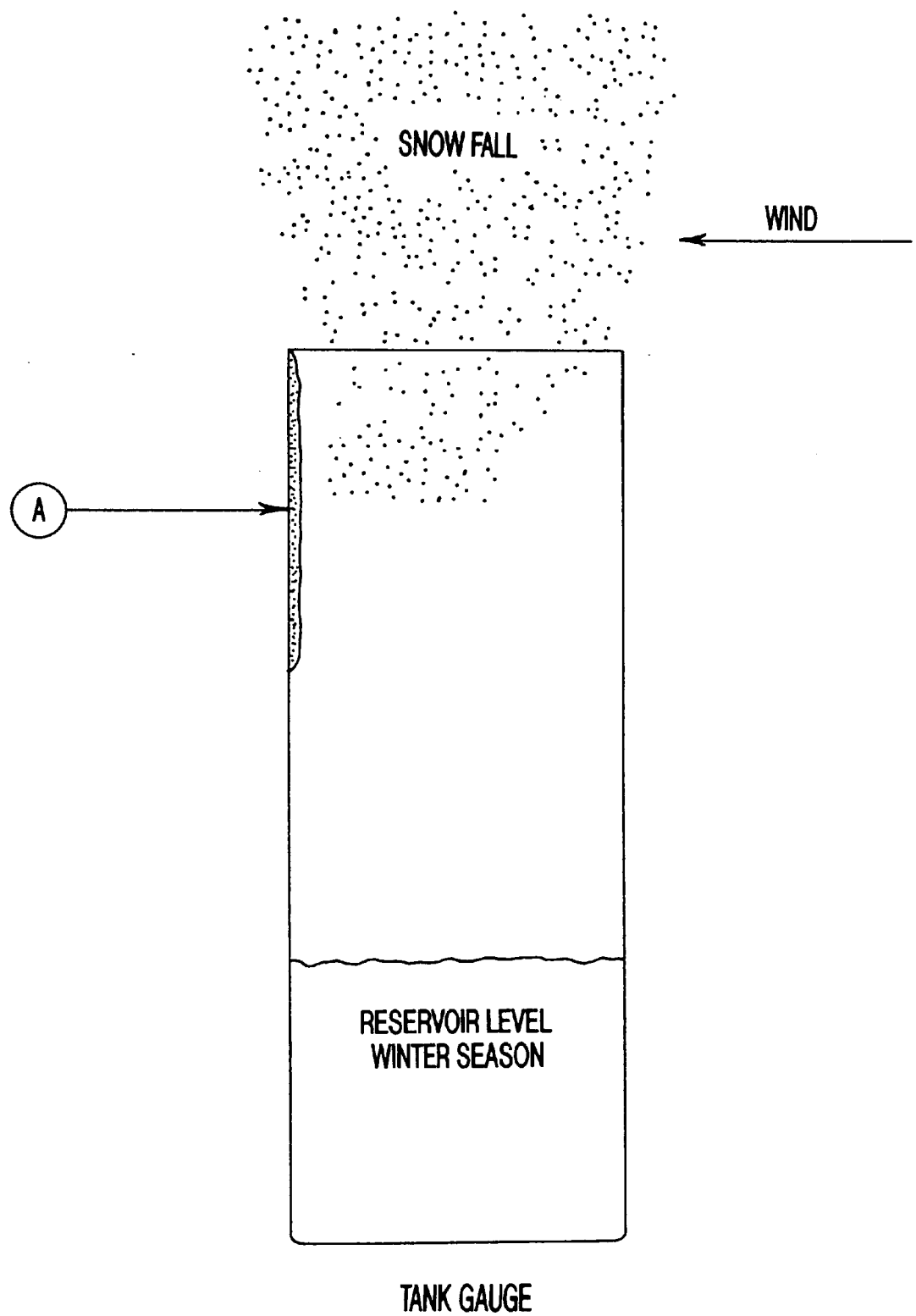
FIG. 1 shows a prior art precipitation gauge.
Figure 2:
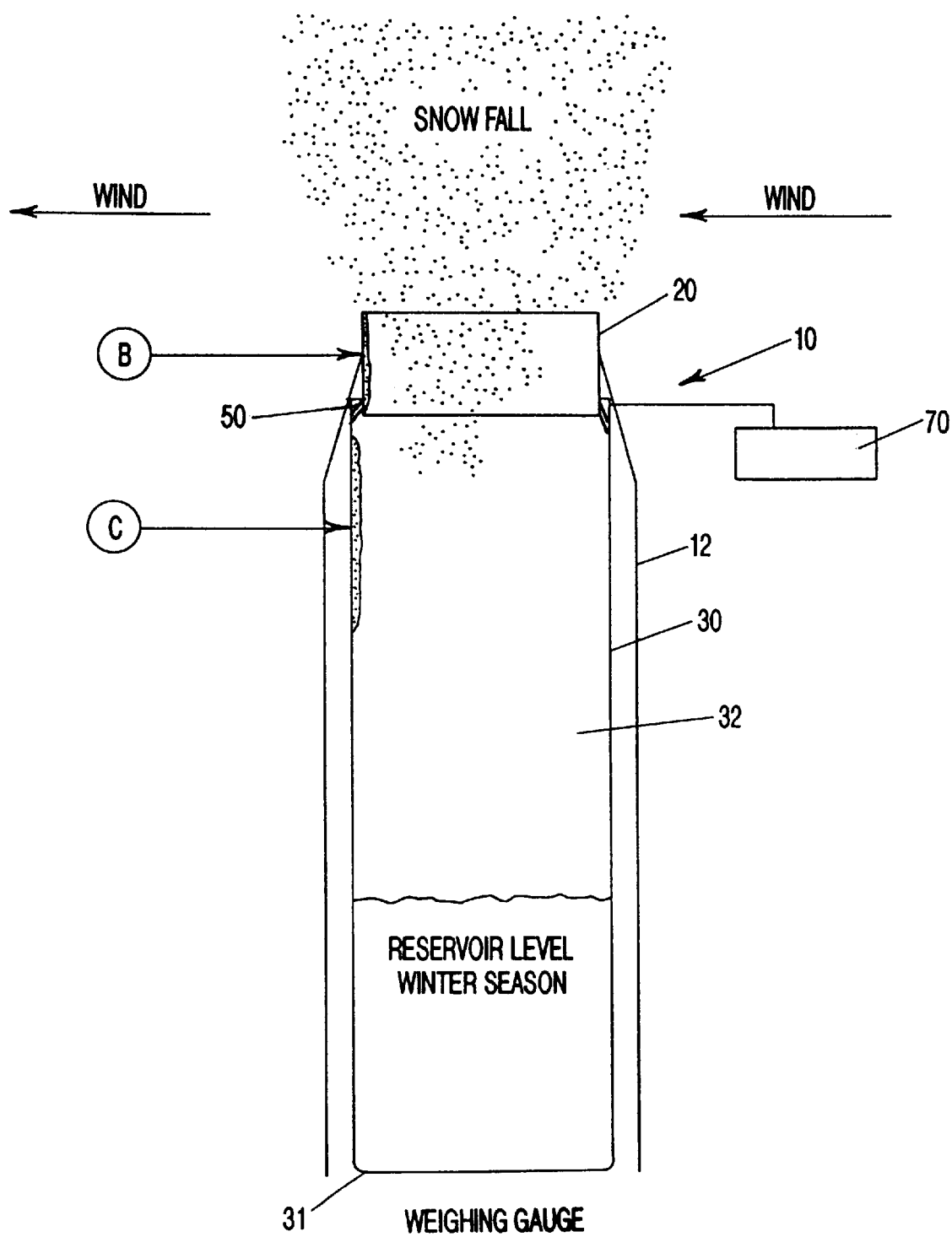
FIG. 2 is a precipitation gauge in accordance with the present invention.

There is shown in FIG. 1 a prior art precipitation gauge with snow falling into the reservoir to demonstrate the problem of the accumulation of snow in the reservoir, particularly where wind is forcing the snow against one side of the reservoir, where, because it is unheated, the snow may accumulate as shown at A on FIG. 1 and B and C on FIG. 2. In a rain gauge where the measurement is taken by the level of precipitation in the reservoir, it will be apparent that the reservoir level does not change as a result of the collection of precipitation which has not reached the water but is rather accumulated on the side of the reservoir wall.

Figure 3:
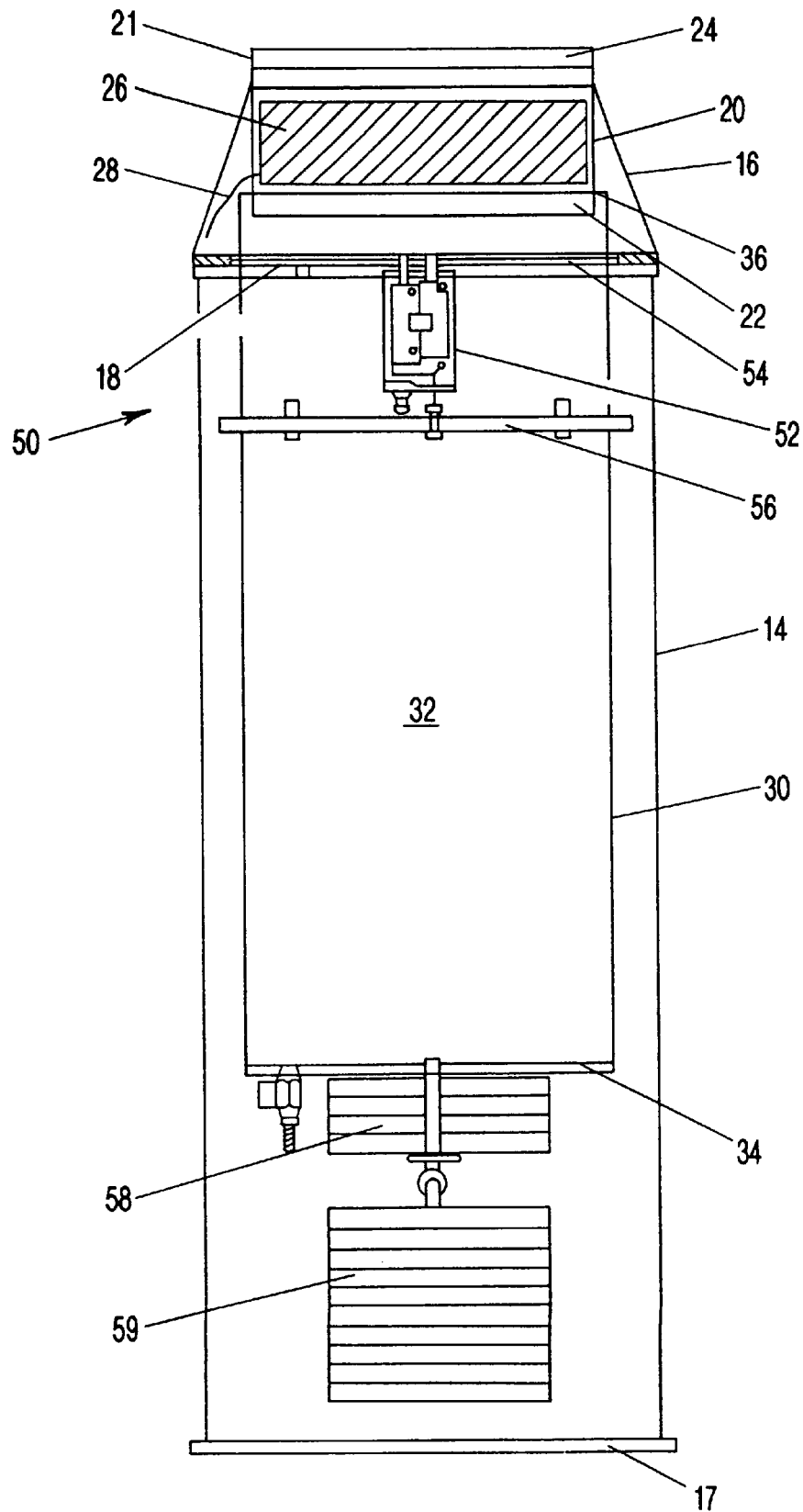
FIG. 3 is a more detailed view of the major components of the precipitation gauge of the present invention.

One embodiment of a precipitation gauge in accordance with the present invention is shown at 10 in FIG. 2 and FIG. 3. The device 10 includes a supporting structure 12 which in this embodiment is a cylinder 14 of suitable structural material such as steel, aluminum, or structural plastic. The upper end 16 of the cylinder 14 is funnel-shaped and terminates in an opening. The lower end of the cylinder 14 forms a base 17 (see FIG. 3) which may be placed upon a cement slab or directly on relatively level earth at the site where the precipitation is to be measured. A support ring 18 is mounted inside and near the top of cylinder 14.

Partially inserted within the opening of the funnel portion of the supporting cylinder 14 is a collector assembly, indicated generally at 20, comprising a cylinder 21 having equal area openings at the upper and lower ends 24, 22. The collector assembly 20 is fixedly mounted to the supporting structure 12 and depends into the funnel-shaped portion of the supporting cylinder 14.

Within the supporting structure 12 there is provided a container or reservoir, shown generally at 30, which comprises a cylinder 32 with a smaller diameter than the diameter of the cylinder 14. The cylinder 32 has a closed bottom 34 which may be integral with the cylinder 32 of the container 30 or may be joined by some liquid-tight seal. The upper end of the cylinder 32 is slightly larger in diameter than the external diameter of the collector assembly 20 and is so arranged that the lower end 22 of collector assembly 20 depends slightly within the open upper end 36 of the container 30.

A weighing mechanism 50 (see FIG. 3) is permanently attached to the support ring 18 at the top of the cylinder forming the support structure 12 and supports or suspends the reservoir 30 in a manner to be described below.

The precipitation gauge also includes a means 70 for electronically controlling various subassemblies of the precipitation gauge, as described in more detail below, and cooperates with the weighing mechanism 50 for, at least, converting the measurement of the weight of the reservoir 30 to accumulated precipitation.

Heating means shown generally at 26 is disposed within or on the surface of the cylinder 21. The heating means 26 may be installed on the inside of the cylinder 21, or on the external surface if the cylinder is fabricated from a good heat-conducting material such as copper. A wide variety of heating elements may be provided utilizing the general principle of resistance heating. In the embodiment shown, a preferred heating element is fabricated from a laminated silicon rubber and metal foil which can be vulcanized directly to the cylinder 21 for optimal heat transfer. The heating means 26 has a series of wires or leads 28 that are attached to an electrical power source (not shown).

It will be understood that the purpose of the heating means is to raise the temperature of the inner surface of the collector assembly 20 so that frozen water, whether in the form of sleet, freezing rain, or snow, which might accumulate on the inner surface of the collector assembly is melted. For this purpose, the heating element is proportionally controlled so that the temperature is maintained on the entire inner surface of the collector assembly at a temperature that is not substantially higher than freezing temperature but is at least several degrees higher. A particular feature of the heating means of the present invention is that the heating means is divided into a plurality of individual heating elements or regions each of which may be independently heated and proportionally controlled. The purpose of this selective heating of various portions of the inner surface of the collector cylinder 21 is to overcome the possibility that where snow or sleet is accompanied by a wind, the wind may cause only a portion of the inner surface of the collector assembly wall to be exposed to the accumulation of snow or ice. Since this precipitation must be measured, it is important that the heating means be sufficient in the region where the accumulation of ice or snow takes place to melt the snow, allowing the water to fall into the reservoir 30 in a timely fashion. The heating means 26 may therefore be broken up into either a few or a sizable number of individual regions each of which may be individually controlled depending upon real time meteorological conditions and the resulting heat loss characteristics. It will also be understood that another purpose for heating the inner surface of the collector assembly is to prevent the accumulation from increasing to the point where the area of the open end 24 of the collector cylinder 21 would be reduced as a result of the accumulation so as to prevent that portion of rain or snow that is falling directly onto the area encompassed by the upper opening 24 to be reduced which would then change the amount of precipitation received in the reservoir thus adversely affecting the calculation of the precipitation such as in inches per given time period. An additional purpose of individual heater zones is to reduce overall energy dissipation to the minimum required to prevent snow and ice accretion on the collector. The plurality of heaters, together with independent controls eliminates unnecessary heat dissipation in areas of the collector surface not experiencing high heat loss. This reduces the chance of a warm air plume forming over the orifice which can reduce precipitation catch.

The reservoir 30 is suspended by the weighing mechanism 50 to permit the indication of the increased weight of the reservoir 30 as a result of accumulated precipitation. In the preferred embodiment of the invention as disclosed in FIG. 3, the measuring mechanism 50 may comprise one or more—in the embodiment shown, three—force-sensing transducer assemblies, one of which is shown at 52. The transducer assembly 52 may be of the type wherein the active force sensing element is a strip of metal, and more advantageously for the present invention, a vibrating strip such as disclosed in U.S. Pat. No. 4,914,962. One of the significant benefits of this type of force-sensing element is its low susceptibility to creep or drift as a result of changes in temperature and/or time. Moreover, this type of transducer assembly is easily adjustable by altering the thickness or width of the strip so as to accommodate different loads without any change in the overall transducer assembly size. Still another advantage of this type of force-sensing element is its freedom from appreciable torsion and temperature effects. The strip force-sensing transducer of the present invention operates on the principle that when an excitation electrical signal vibrates the transducer while measuring the force, the resonant frequency (rather than the merely analog signal amplitude) is measured thereby eliminating any effects of resistivity change.

In the preferred embodiment shown in FIG. 3, the transducer 52 is connected to the ring 18 fixedly mounted within the outer cylinder 14 of the support structure 12 and a second ring 56 which is attached around the periphery of the reservoir cylinder 32. Weighing means 50 may also include means for calibrating the weight of reservoir 30, which may be adjusted by a series of weights 59 that are removably attached to the lower end of container 30. For purposes of calibration, a hook or other device may be provided depending from the bottom of the container 30 and to which the series of weights 59 may be manually added to then calibrate the container to assure accurate measurement of the accumulated precipitation.

Figure 4:
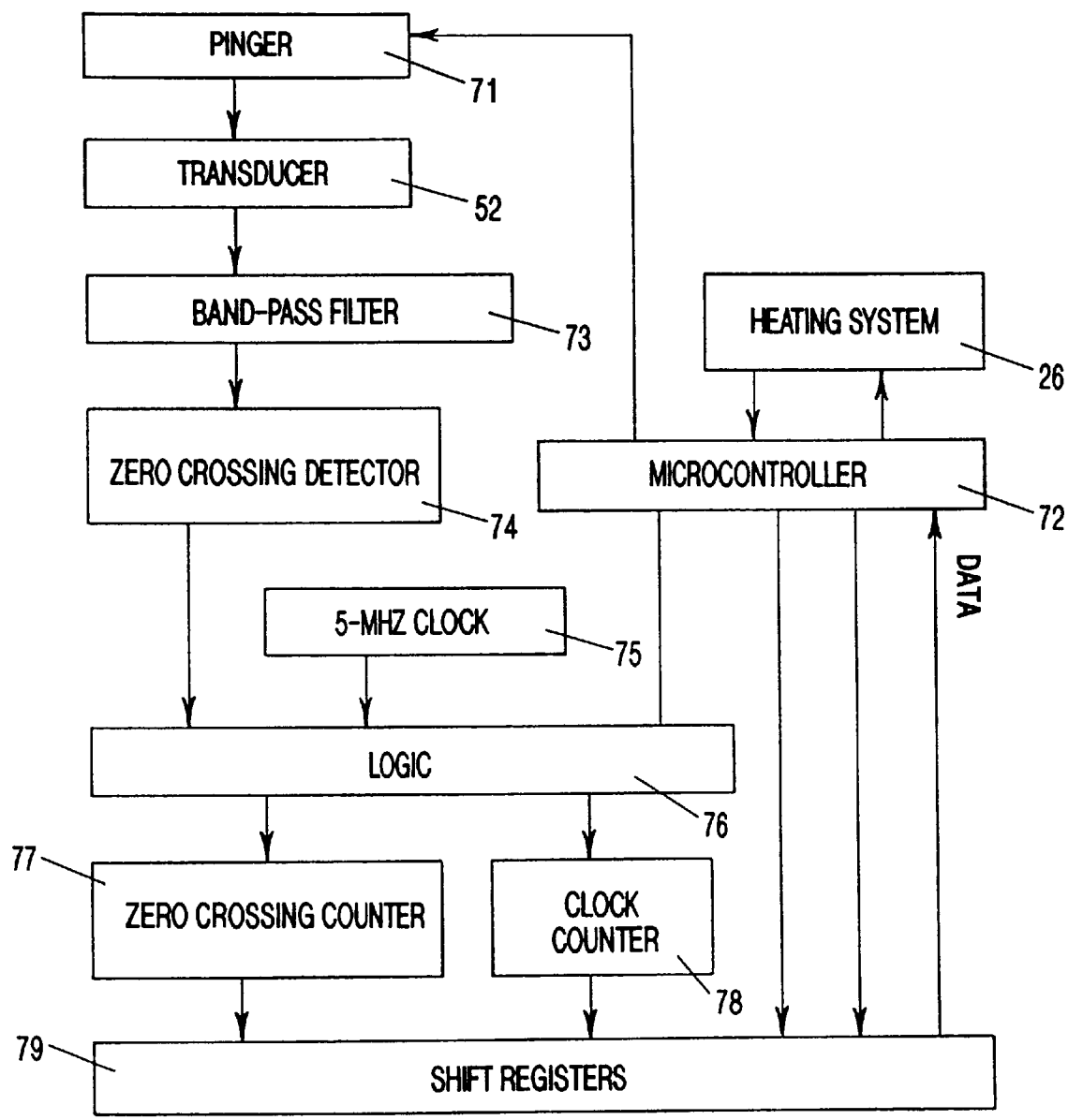
FIG. 4 is a block diagram of the control means of the invention.

The control means 70 of the present invention comprises the block diagram circuits shown in FIG. 4. The control means 70 serves a variety of functions in gauge 10, including control of excitation energy to the force transducers 52, control of electrical energy to the heating elements 26 through leads 28, and conversion of frequencies to digital signals.

The means for providing programmable excitation energy to the force transducers 52 includes a pinger circuit 71 under the control of a microcontroller 72. The pinger circuit 71 may be programmed so as to provide a plurality of excitation pulses of program-controlled pulse width and separation. Control is desirable because a vibrating wire in the transducer 52 has excitation requirements that vary with the load applied. Too much excitation produces harmonic distortion and too little excitation adversely affects accuracy by reducing the signal-to-noise ratio. Pinger circuits are well known in the art.

The control means 70 also includes the means for controlling the independent regions of the heating means 26 so as to maintain collector inlet temperature under high wind conditions with a minimum power budget, as explained above. The heating means 26 may comprise, for example, four quadrants on the collector assembly 20, each having its own thermistor to sense the temperature of the quadrant. The microcontroller 72 switches power supplied to the heaters. Based on the target temperature of the inner wall of the collector assembly 20, which as noted above may be several degrees above freezing, the control means 70 compares the target temperature with the measured temperature data so as to determine the percentage of cycles of the A.C. power to be distributed to each heater quadrant. Where high wind conditions cause the accumulation of snow or sleet in one quadrant of the collector assembly 20, the microcontroller 72 responding to the measured temperature data will allocate a larger number of cycles of the A.C. power to those quadrants where measured temperature data indicates the accumulation.

The purpose of the band pass filter 73 is to obtain an optimum electrical signal-to-noise ratio over the full range of signal frequencies. The conversion of frequency to digital signals comprises a zero crossing detector 74, a 5 MHZ clock 75, logic circuitry 76, a zero crossing counter 77, a clock counter 78, and shift registers 79. The counting logic ensures that clock and zero crossing routine begins and ends on a zero crossing edge. The frequency is measured by detecting and counting the zero crossing cycles of the transducer 52 signals and calculating the frequency by multiplying the clock rate times the dividend of one plus the zero-crossing cycle count divided by the clock count. The logic circuitry 76 receives the zero-crossing comparator signal and enables and disables a count in the zero-crossing counter 77 and the clock counter 78. Shift registers 79 transfer these counts to microcontroller 72 to determine the force measured by the transducer 52 so as to indicate accumulated precipitation.

The control means 70, in addition to providing the conversion from frequency to digital, may include transmitting means so as to send a digital signal to another site, which may be a central site, if the gauge 10 is used in a remote location. Since the output signal of the transducers may have a weak dependence on temperature, proper temperature compensation may be included in the circuits comprising the control means 70. Such temperature compensation is well known in the art. The control means 70 may also include a filter circuit for eliminating any wide variation in the output of the transducer signal due to fluctuations in the power source.

Figure 5:
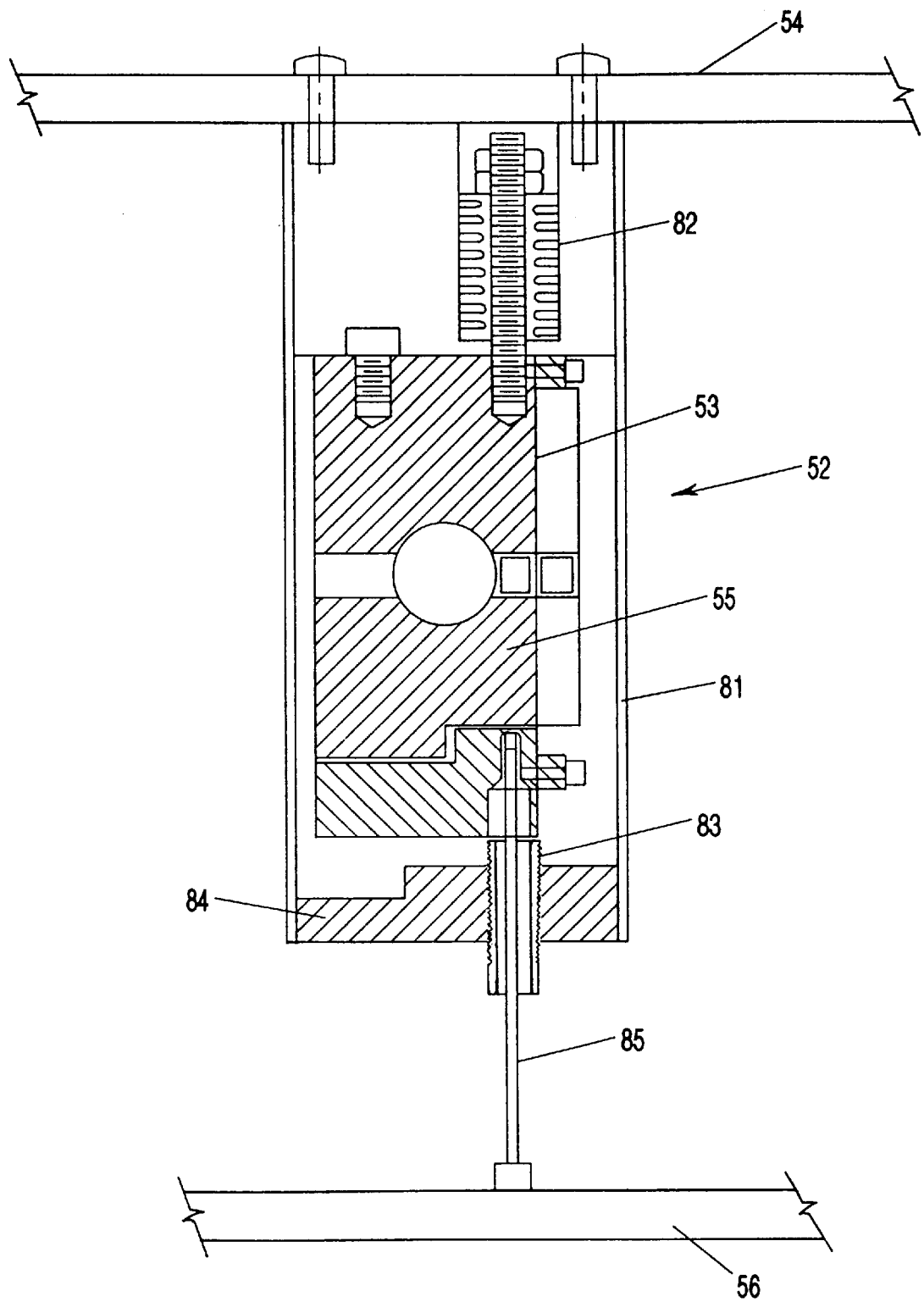
FIG. 5 is a detailed view of a force-sensing transducer for the gauge shown in FIG. 3.

Finally, the transducers may be protected against damage during transportation of the gauge 10 by providing overload and shock protection. One type of overload and shock protection means 80 is shown in FIG. 5. Overload protection may be achieved by means which causes the transducer housing 81 to bear any incremental load which exceeds the design range of the transducer 55. One possible embodiment involves the use of a pre-compressed spring 82 and adjustable stop 83. A spring mounted in axial alignment with the vibrating strip 53 may be adjusted to pull the transducer body against a hard stop with force equivalent to or moderately below the design range of the transducer. Under overload conditions, as the applied force begins to exceed the design rating, the body 55 of the transducer leaves its hard stop, and moves downward, until the lower block 84 of the transducer comes to rest on the adjustable stop ferrule 83. Any additional overload force is taken up by the combination of stop ferrule and transducer housing. The load cable 85 passes through the stop ferrule so as to engage the lower block concentrically about the load cable and thereby avoid any torque moments on the lower block of the transducer It will therefore be seen that the preferred embodiment of the present invention discloses a number of advantages over prior art devices and solves a number of the problems previously unresolved in the prior art. It should be understood that a variety of different components may be utilized to accomplish the broad objectives set forth in the above description. By way of example, a variety of force transducers may be utilized in the present invention some of which may have advantages which are more or less than the advantages of the vibrating strip force-sensing transducers described above. Similarly, a wide variety of heating device materials, construction, and operation may be substituted for that described above but retaining the advantageous feature of individual heated regions that may be proportionally controlled. Still other changes may be made to the control means and its various functions without affecting the overall benefits of the present invention. Therefore, it is to be understood that, within the scope of the appended claims, the invention may be practiced other than as specifically described in reference to the preferred embodiment.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application(s), are hereby incorporated by reference.

What is claimed is:

1. A gauge for measuring the liquid equivalent of all forms of natural precipitation comprising:
    a support structure;
    a precipitation reservoir;
    a collector assembly fixedly mounted to said support structure above said reservoir and continuously depending into an open upper end of said reservoir;
    means for suspending said reservoir from said structure and for weighing said reservoir; and
    electronic control means, cooperating with said means for suspending and weighing, for converting measurement of the weight of said reservoir to accumulated precipitation.

2. The gauge of claim 1 wherein said means for suspending and for weighing comprises force transducer means.

3. The gauge of claim 2 wherein said force transducer means comprises strip force sensing transducer means.

4. The gauge of claim 3 wherein said strip force transducer means comprises vibrating strip force sensing transducer means.

5. The gauge of claim 4 wherein said electronic control means further comprises means for providing programmable excitation energy to said transducer means.

6. The gauge of claim 5 wherein said means for providing excitation energy produces vibration of sufficient amplitude to assure accurate transducer output signal quality.

7. The gauge of claim 6 wherein said excitation energy means produces sufficient vibration amplitude under widely varying load conditions.

8. The gauge of claim 7 wherein said force transducing means includes at least three vibrating strip force sensing transducers.

9. A gauge for measuring the liquid equivalent of all forms of natural precipitation comprising:
    a support structure;
    a precipitation reservoir;
    a collector assembly fixedly mounted to said support structure above said reservoir and continuously depending into an open upper end of said reservoir;
    means for suspending said reservoir from said structure and for weighing said reservoir; and
    electronic control means, cooperating with said means for suspending and weighing, for converting measurement of the weight of said reservoir to accumulated precipitation; wherein said collector assembly includes heating means.

10. The gauge of claim 9 wherein said heating means comprises a plurality of independently heated means.

11. The gauge of claim 10 wherein each said independently heated means is under the control of said electronic control means.

12. The gauge of claim 11 wherein said electronic control means includes means for proportionally distributing electrical energy so as to maintain each independent heating means at an above-freezing temperature.

13. The gauge of claim 1 additionally including reservoir weight calibration means.

14. The gauge of claim 1 wherein said electronic control means includes means for converting measurement of the weight of said reservoir to incrementally accumulated precipitation.

15. A precipitation measuring gauge comprising:
    support means;
    a precipitation container; and
    means for suspending said container from said support means, said suspension means comprising force-sensing transducer means connected between the support means and the precipitation container for producing an electric output signal proportional to the weight of precipitation collected in the container; and electronic control means, cooperating with said transducer means for producing an electric output signal, for converting said output signal to a measurement of accumulated precipitation.

16. The gauge of claim 15 wherein said force transducing means comprises at least one strip force sensing transducers.

17. The gauge of claim 16 wherein said strip force sensing transducer is vibrating during operation.

18. The gauge of claim 16 additionally including electronic control means for converting the output signal of the transducer means to a measurement of accumulated precipitation.

19. The gauge of claim 18 wherein said electronic control means includes temperature compensating means.

20. In a gauge for measuring both liquid and frozen precipitation comprising a reservoir for receiving such precipitation from which accumulated precipitation is measured and a collector assembly including a collector surface, the improvement comprising:

means for suspending said reservoir, comprising transducer means for measuring the weight of said reservoir;

electronic control means, cooperating with said transducer means, for converting measurement of the weight of said reservoir to accumulated precipitation; and heating means for proportionally controlling the temperature of regions of said collector surface to produce a temperature in substantially all portions of the collector surface that is not substantially above freezing.

* * * * *